United States Patent [19]

Traini et al.

[11] 4,230,542

[45] Oct. 28, 1980

[54] ELECTROLYTIC PROCESS FOR TREATING ILMENITE LEACH SOLUTION

[75] Inventors: Carlo Traini; Giuseppe Bianchi; Alberto Pellegri, all of Milan, Italy

[73] Assignee: Oronzio de Nora Impianti Elettrochimici S.p.A., Milan, Italy

[21] Appl. No.: 55,018

[22] Filed: Jul. 5, 1979

[30] Foreign Application Priority Data

Oct. 13, 1978 [IT] Italy ............................... 28736 A/78
Jan. 11, 1979 [IT] Italy ............................... 19206 A/79

[51] Int. Cl.³ .......................... C25B 1/00; C25B 1/06
[52] U.S. Cl. ..................................... 204/93; 204/112; 204/130
[58] Field of Search ......................... 204/93, 112, 130

[56] References Cited

U.S. PATENT DOCUMENTS 2,810,686  10/1957  Bodamer et al. ................... 204/112

*Primary Examiner*—R. L. Andrews
*Attorney, Agent, or Firm*—Hammond & Littell, Weissenberger and Muserlian

[57] ABSTRACT

A method of reducing ferric ions in a sulfuric acid ilmenite leach solution to ferrous ions comprising circulating a sulfuric acid ilmenite leach catholyte solution through the cathodic compartment of an electrolysis cell separated by a fluid-impervious anion exchange membrane from the anodic compartment, circulating a ferrous sulfate anolyte solution through the anodic compartment of the electrolysis cell and impressing an electrolysis current across the cell to reduce the ferric ions in the catholyte to ferrous ions and to oxidize a portion of the ferrous ions to ferric ions in the anolyte to prevent oxygen evolution in the anodic compartment and to an off-peak method of electrolysis operation to reduce energy consumption and to reduce or eliminate ferrous sulfate by-product.

10 Claims, 2 Drawing Figures

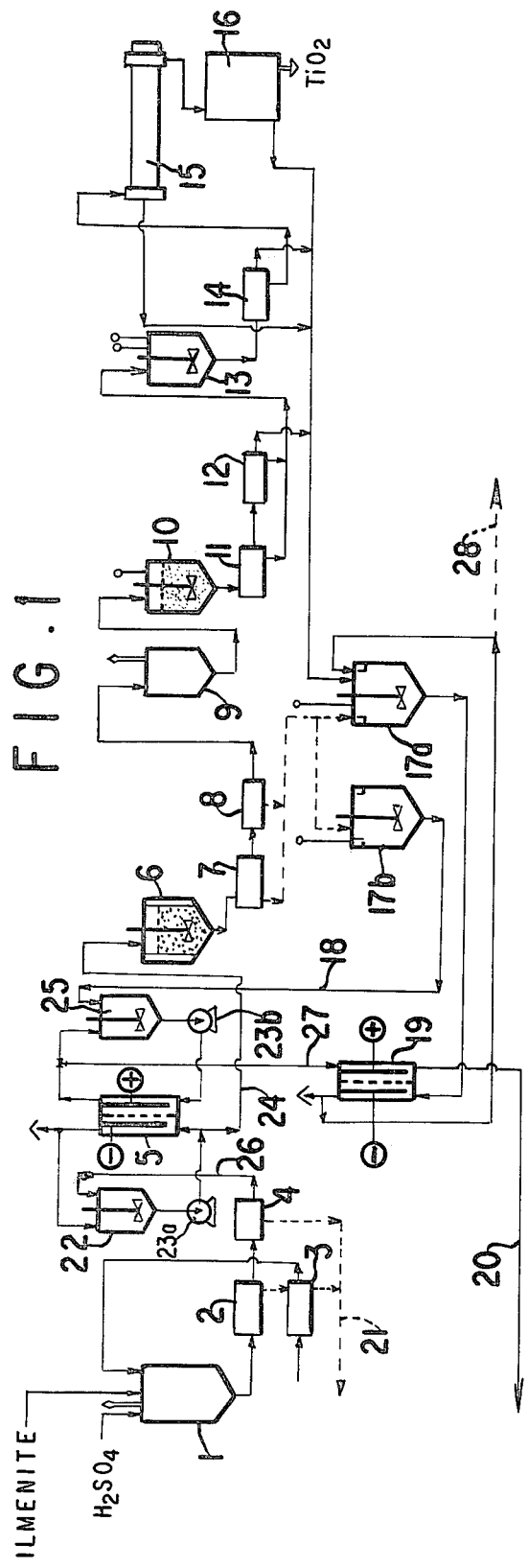
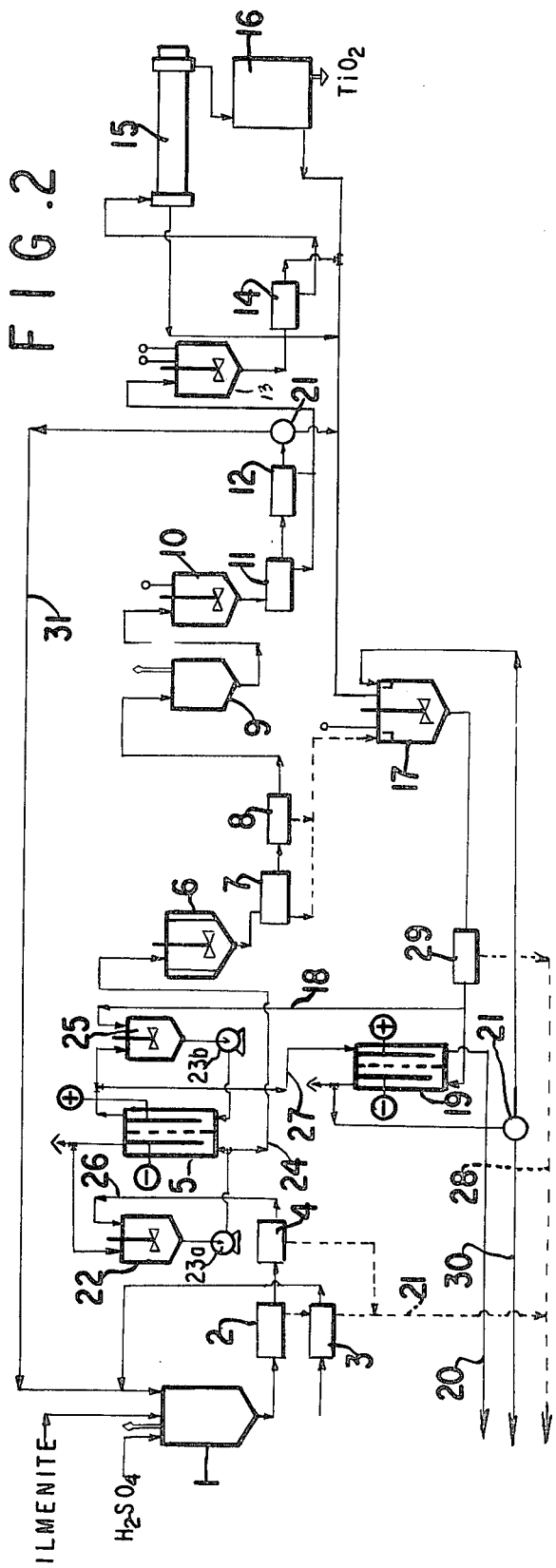

ELECTROLYTIC PROCESS FOR TREATING ILMENITE LEACH SOLUTION

STATE OF THE ART

As is well known, titanium dioxide may be produced by sulfuric acid leaching of ilmenites to form a titanyl sulfate solution, and followed by thermal hydrolysis of the said solution to produce titanium hydroxide, which is then filtered and kiln-treated to produce titanium dioxide. The leaching solution is strongly contaminated with divalent and trivalent iron which is largely due to the presence of iron in the raw material and such iron must therefore be separated from titanium in the process. In particular, the presence of trivalent iron in the hydrolysis step must be absolutely avoided.

In the conventional techniques, the acid leach solution is generally treated with scrap iron to reduce the trivalent iron to its divalent state, thereby affording at least a partial separation by crystallization of iron as $FeSO_4.7H_2O$. This procedure, however, entails several disadvantages, particularly inasmuch as decantation and centrifugation are rendered more cumbersome due to the presence of a greater amount of iron to be separated. Moreover, more sulfuric acid is consumed to dissolve the metallic iron and greater quantities of waste mud (ferrous sulfate) are also produced giving rise to serious disposal problems besides causing a large consumption of metallic iron.

To overcome these and other disadvantages, an electrochemical method was proposed several years ago whereby the ilmenite leaching solution was passed through a battery of diaphragm electrolytic cells to reduce trivalent iron to divalent iron in the cathode chamber, while recovering sulfuric acid in the anode chamber. Under optimized conditions, a cathode current efficiency of about 70% was possible for the reduction of ferric iron to ferrous iron. However, this method has found no industrial application because of high costs, rapid wear rates of the anodes due to oxygen evolution in a strongly acidic environment and high energy consumption, waste mud disposal still remaining an unsolved problem.

OBJECTS OF THE INVENTION

It is an object of the invention to provide an improved process for reducing ferric ions in sulfuric acid ilmenite leach solution to ferrous ions with less energy consumption and less ferrous sulfate waste.

It is another object of the invention to provide a novel process substantially eliminating ferrous sulfate by-product production in production of titanium dioxide obtained by sulfuric acid leaching of ilmenite by recovery of metallic iron in a second electrolytic step.

These and other objects and advantages of the invention will become obvious from the following detailed description.

THE INVENTION

The novel process of the invention for reducing ferric ions in a sulfuric acid ilmenite leach solution to ferrous ions comprises circulating a sulfuric acid ilmenite leach catholyte solution through the cathodic compartment of an electrolysis cell separated by a fluid-impervious anion exchange membrane from the anodic compartment, circulating a ferrous sulfate anolyte solution through the anodic compartment of the electrolysis cell and impressing an electrolysis current across the cell to reduce the ferric ions in the catholyte to ferrous and to oxide a portion of the ferrous ions to ferric ions in the anolyte to prevent oxygen evolution in the anodic compartment. A cascade series of electrolytic cells may be used as well.

The process of the invention has several advantages over the prior art processes. There is a considerable reduction in the amount of ferrous sulfate waste, since no metallic iron is required, which greatly simplifies disposal problems. The process produces non-polluting ferric sulfate which is a valuable by-product. Also very important is the reduced electrical energy consumption for the electrochemical reduction of ferric ions to ferrous ions as compared to the prior art electrolytic process.

The anolyte solution containing ferrous ions may be obtained by dissolving ferrous sulfate in water, preferably ferrous sulfate crystallized and recovered from titanyl sulfate and ferrous sulfate solution effluent from the cathode chamber. In this manner, the anode is effectively depolarized and oxygen evolution by oxidation of water is prevented resulting in all the anodic energy consumption being used for oxidation of ferrous ions to ferric ions. In the catholyte, ferric ions are reduced to ferrous ions and preferably there is sufficient of tetravalent titanium being reduced to trivalent titanium to prevent the ferrous ion from being reoxidized in subsequent operations.

Anodic oxidation of ferrous ions to ferric ions is highly favoured, from a thermodynamical standpoint, with respect to water oxidation and the anodic current efficiency results substantially equal to 100% for the anodic oxidation of iron while oxygen evolution at the anode is effectively prevented. The process of the present invention offers the advantage, over the conventional electrolytic process, by reducing cell voltage by about 0.5 V due to the lower anodic potential for the oxidation of ferrous ions to ferric ions with respect to oxygen evolution potential, with a considerable energy saving. Moreover, since oxygen anodic evolution is practically avoided, relatively cheap materials such as graphite, graphite impregnated with metal oxides to improve its resistance to oxidation, or vitrous carbon can be utilized to produce the anodes instead of very expensive metals such as platinum and iridium. Moreover, a large part of the ferrous ions separated from the titanyl sulfate during the various stages of the process to produce titanium dioxide is oxidized to ferric ions.

In practice, depending on the ratio of ferric ions to ferrous ions present in the ore, the residual ferrous sulfate by-product corresponds to about 40% to 70% of the iron contained in the raw material, with the balance being anodically oxidized to ferric sulfate.

In a preferred embodiment, the mass transfer to the electrodes of the cell may be improved by operating with a high anolyte and catholyte speed in their respective chambers thus enabling utilization of higher current densities with a consequent reduction of the electrodic surface areas for the same production capacity while maintaining a high Faraday efficiency for the electrolytic process. This mode of operation may be carried out with the use of proper tanks hydraulically connected in parallel with the respective anode and cathode chambers. Mass transfer to the electrodes may also be improved with the aid of suitable turbulence-inducing means, such as baffles or the bubbling of gases.

The electrolytic system described above may also afford an economically valuable mode of operation in which the cathodic reduction of the ilmenite leaching solution may be effected during off-peak periods, such as at night when electric power is supplied at a lower cost by storing a reduced solution containing a high amount of trivalent titanium in a storage tank of suitable capacity and then chemically reducing ferric ions to ferrous ions in said tank, when, conversely, power is supplied at a higher cost.

In a second embodiment of the invention, the remainder of the ferrous ions solution obtained by dissolving the ferrous sulfate crystallized and filtered off form the titanyl sulfate and ferrous sulfate solution effluent from the cathode chamber of the aforesaid cell and/or the diluted sulfuric acid solution containing ferrous sulfate recovered after the thermal hydrolysis of the titanyl sulfate solution, is flowed through the cathode chamber of a second electrolytic cell, or of a system of cells in cascade, separated from the corresponding anode chamber by a fluid-impervious anion-permeable membrane.

Meanwhile, the solution effluent from the anode chamber of the first cell and still containing ferrous sulfate together with ferric sulfate formed by oxidation of ferrous ions to ferric ions in said chamber, is flowed through the anode chamber of the second electrolytic cell, or series of cells. Thus, metallic iron plates out on the cathode of the second cell and is recovered while substantially all the residual amount of ferrous ions still present in the anolyte solution is oxidized to ferric ions in the anode chamber thereof.

The iron-depleted solution effluent from the cathode chamber of the second cell may be recycled to the dissolving tank and the ferrous sulfate enriched solution may be fed back again therefrom to said cathode chamber. By continuous enrichment, a high concentration of ferrous sulfate in the catholyte is maintained, preferably not less than 50 g/l., a high cathode current efficiency is thereby obtained for iron plating which is more than 75–80% at a rather high current density, usually greater than 400 A/m$^2$.

The iron depleted cathodic solution may then be finally sent to a system for the concentration of sulfuric acid thereby also recovering the residual amount of ferrous sulfate, or be fed back to the ilmenite leaching stage to dilute the leach solution. The ferrous sulfate solution fed into the anode chamber of the second cell may be represented by the solution effluent from the anode chamber of the first cell, which solution still contains a certain amount of ferrous sulfate as well as ferric sulfate due to the oxidation of ferrous ions to ferric ions at the anode of the first cell.

In this case, the anolyte effluent from the second cell contains a greater amount of ferric sulfate and a negligible residual amount of ferrous sulfate. Of course, the ferrous sulfate solution may as well be first fed to the anode chamber of the second cell and then to the anode chamber of the first cell with substantially the same results. As another possibility, the ferrous sulfate solution may be separately fed to the respective anode chambers of the two cells, separately withdrawing therefrom the effluent solution containing a high amount of ferric sulfate and a small residual amount of ferrous sulfate.

Many different practical embodiments of the invention may be resorted to, falling within the spirit and the scope thereof. In fact, both the process and the apparatus therefore allow a great elasticity of operation. In particular, the mode for carrying the oxidation of ferrous sulfate at the anode of two electrolysis cells may be chosen among different practical embodiments of the invention, considering that during titanyl sulfate processing, the ferrous sulfate is recovered partly as a solid precipitate and partly as a dilute sulfuric acid solution. The choice of the most suitable embodiment depends upon considerations hereinbelow discussed.

It must be considered that the ferrous sulfate separated by crystallization and filtration of the reduced titanyl sulfate solution is sufficiently pure since it is not contaminated by sulfuric acid or other metal salts, while the remaining ferrous sulfate recovered downstream from the hydrolysis stage after the titanyl sulfate as a dilute sulfuric acid solution is contaminated with other metal salts such as manganese, chromium, etc. salts, which are present as impurities in the starting mineral.

On the other hand, the ratio of solid ferrous sulfate recovered in the crystallization step to the total iron present in the starting ilmenite may vary between 2:3 to 1:2, and largely depends upon the iron/titanium ratio in the starting mineral, while the rest of the iron remains in the dilute sulfuric acid solution recovered downstream from the titanyl sulfate hydrolysis step. It must also be considered that there is a stong demand for sufficiently pure ferric sulfate usable for water treatment and for reclamation of soils and lagunas.

In a preferred embodiment of the invention, a portion of the solid ferrous sulfate recovered from the crystallization stage may be therefore advantageously dissolved in a separate tank and then the resulting solution may be fed to the anode chamber of one or both of the electrolysis cells to produced a substantially pure ferric sulfate solution, or to allow precipitation therefrom of ferric sulfate substantially pure and suitable for various uses.

The sulfuric acid solution recovered downstream from the titanyl sulfate hydrolysis step and containing ferrous sulfate and impurities may be advantageously fed to the cathode chamber of the second cell, wherein the ferrous ions are reduced to metallic iron which deposits onto the cathode. The cathodic reduction to metallic iron is a highly selective electrodic reaction and the deposited iron is substantially pure (99.99%) regardless of the level of impurities present.

Therefore, the impurities coming from the starting mineral accumulate in the cathodic solution which is flowed back to the dissolving tank to enrich it in ferrous sulfate content. When the impurities content reaches a certain level or at the end of a batch run, the solution may be disposed of and then a new batch run may start with a fresh solution from the titanyl sulfate hydrolysis step. The dilute sulfuric acid solution which may be discharged from the cathode circuit of the second cell, as described, may then be sent to a system for concentrating and purifying the sulfuric acid while recovering the residual ferrous sulfate and the other metal salts.

It has been found that the current efficiency of the anodic oxidation of ferrous ions to ferric ions in the current density range from 400 to about 1500 A/m$^2$ is constantly between 97 to 100% down to a residual ferrous ion concentration of about 20–30 gpl in the anolyte. When said concentration falls below such values, the current efficiency proportionally falls since oxygen tends to evolve at the anode due to water electrolysis. Therefore, in a preferred embodiment of the process of the invention, a solution, preferably saturated or nearly saturated with ferrous sulfate recovered substantially pure from the crystallization step, is fed to the anolyte circuit of the first cell comprising the anode chamber and a recycle tank in parallel connection thereto to maintain in the anolyte of the first cell, a ferrous sulfate concentration high enough to allow a high current efficiency. The anolyte from the circuit of the first cell is then flowed through the anode chamber of the second cell or of a second group of cells connected in series to reduce the residual ferrous sulfate content to less than 5–20 gpl.

By this procedure, a high current efficiency is obtained in the first cell which generally has a very high production capacity as all of the ferric ions present in the charge mineral are reduced to the ferrous ion state therein, while in the second cell which generally has a lower production capacity than the former, the ferrous sulfate is further oxidized to ferric sulfate with a lower current efficiency. Metallic iron in a highly pure state is meanwhile produced at the cathode of said second cell.

According to a less preferred embodiment of the process of the invention, the second cell or system of cells may be equipped with a fluid-impervious, cation-permeable membrane to divide the same into an anode and a cathode chamber. Thus an iron-depleted and acidified catholyte is recovered therefrom which is then partly fed back to the dissolving tank to pick up more ferrous sulfate and partly continuously recovered and sent to a system for concentrating and recovering the sulfuric acid.

Referring now to the drawings:

FIG. 1 is a flow-sheet of one preferred embodiment of the process illustrating the use of a second electrolytic cell equipped with an anionic membrane.

FIG. 2 is a flow-sheet of another embodiment of the invention wherein the second electrolytic cell has a cationic membrane.

In the process of FIG. 1, finely crushed ilmenite ore is leached with sulfuric acid in leaching tank 1 and is then passed into separator 2 to remove the insoluble residues (Si, Ti, Al, Cr oxides). The leaching solution is then fed through clarifier 4 to the cathode chamber of electrolytic cell 5 (or a series of cells), while the insoluble residues are washed with water in tank 3 and withdrawn from the system through line 21. The water is fed back to tank 1 to dilute the leaching solution and in the preferred embodiment illustrated, a recycling tank 22 is connected in parallel with the cathode chamber of electrolytic cell (or series of cells) 5.

The leaching solution coming from clarifier 4 is in fact fed to recycling tank 22 through line 26. With the aid of recycling pump 23a, a part of the solution is circulated at high speed through the cathode chamber(s) of cell 5 wherein cathodic reduction of tetravalent titanium to trivalent titanium occurs. The cathodic effluent is continuously recycled to tank 22 wherein the ferric ions fed into the tank with the leaching solution are chemically reduced at once to ferrous ions. The recycle ratio may vary between 2 and 8, and the streams are regulated depending upon the electrolysis current so that the effluent from tank 22 is free of ferric ions and contains up to 4 gpl of trivalent titanium to prevent the ferrous ions from being eventually oxidized during the subsequent stages of the titanyl sulfate solution processing. The said cathode chamber provided with a hydrogen vent contains a cathode made of titanium or lead or any other high hydrogen overvoltage material, and is separated from the corresponding anode chamber by an anion-permeable membrane represented in FIG. 1 by a vertical dotted line. Such membranes may be made of a fluorinated styrene-divinylbenzene copolymer containing basic radical such as quaternary ammonium groups, pyridine groups and the like. Particularly suitable is the MA-3475 membrane, produced by Ionics.

The reduced solution from the exit line of tank 22 is passed by line 24 to crystallizer 6 wherein it is cooled to about 10°–15° C. A major amount of the ferrous sulfate, corresponding to about $\frac{2}{3}-\frac{1}{2}$ of the iron present in the solution is crystallized and is filtered off in sections 7 and 8. The filtrate liquor, after concentration in evaporator 9, is passed into hydrolysis reactor 10 wherein tetravalent titanium precipitates as the hydroxide, Ti(OH)$_4$. The precipitate separated in separators 11 and 12 from the liquid consisting of a dilute sulfuric acid solution still containing some ferrous sulfate, passes into washing section 13 wherein it is suspended in a reducing environment of zinc and sulfuric acid. Then, after passing through separator 14, it is sent to rotary kiln 15 for calcination and finally to separator 16.

According to a preferred embodiment of the invention, the liquid effluent coming from separators 11 and 12 consisting of dilute sulfuric acid containing ferrous sulfate which has not been crystallized in crystallizer 6 and the soluble impurities from the charge mineral as well as the dilute sulfuric acid from separator 16, are collected in dissolving tank 17a to which a portion of the solid ferrous sulfate coming from separators 7 and 8 is added. The remaining part of said solid ferrous sulfate is dissolved in water in tank 17b.

The concentrated ferrous sulfate solution effluent from tank 17b is fed by line 18 to the anode chamber in FIG. 1 to the recycling tank 25 connected in parallel with the anode chamber(s) of cell 5.

A recycling pump 23b provides continuous recirculation of the solution contained in tank 25 through the anode chamber of the cell wherein the ferrous ions are oxidized to ferric ions at the anode thereof. The recycle ratio may vary within broad limits, preferably between 2 and 20, and the streams are regulated depending upon the electrolysis current to maintain the concentration of ferrous ions higher than 20–40 gpl in the solution effluent from the anode chamber. This allows a current efficiency greater than 97% for the anodic oxidation of ferrous ions.

In the anode chamber of cell 5 provided with an anode made of a material such as graphite, metal oxides impregnated graphite, vitrous carbon or a valve metal base coated with electrocatalytic oxides, ferrous ions are partially oxidized to ferric ions whereby anodic oxygen evolution is avoided with a considerable saving of electric energy. The cell voltage is in fact about 0.5 V lower than the voltage corresponding to oxygen evolution in the known technique. This represents a 25–30% saving with respect to the cell voltage resulting from anodic oxygen evolution under the same conditions.

The residual ferrous ion effluent from the anode chamber is lower than initially present in the leaching solution. To further reduce this amount, the effluent from the anode chamber of cell 5 passes by line 27 to the anode chamber(s) of a second electrolytic cell (or system of cells) 19 provided with an anode made of a material such as graphite, metal oxides impregnated graphite, vitrous carbon or valve metal coated with electrocatalytic oxides.

The said anode chamber is separated from the corresponding cathode chamber by a fluid-impervious, anion-permeable membrane represented in FIG. 1 by a dotted vertical line and the said membrane may be of the same type as the anion-permeable membrane of the first electrolytic cell. In this anode chamber, the residual ferrous ions are further oxidized to ferric ions so that the anodic effluent leaving the system by exit 20 contains mainly ferric sulfate and a small amount (from 5 to 15 gpl) of residual ferrous sulfate. The ferrous sulfate solution coming from tank 17a may of course be fed first to the anode chamber of the second cell and then into the anode chamber of the first cell.

The dilute sulfuric acid solution (7-15% $H_2SO_4$) containing ferrous sulfate and coming from tank 17a is fed to the cathode chamber of the second electrolytic cell provided with a hydrogen vent and a periodically replaceable cathode made of iron, titanium or any other suitable material. At the cathode of cell 19, the ferrous ions are reduced to metallic iron which plates out onto the cathode by the reaction:

$$FeSO_4 + 2e^- \rightarrow FE + SO_4^{2-}$$

The iron-depleted catholyte is at least partially recycled to tank 17a where it is continuously enriched with ferrous sulfate added to the tank. The anion-permeable membrane of this second electrolytic stage permits migration of sulfate anions $SO_4^{2-}$ to the anode chamber wherein the ferrous ions are oxidized according to the reaction:

$$2FeSO_4 + SO_4^{2-} \rightarrow Fe_2(SO_4)_3 + 2e^-$$

whereby sulfuric acid build-up is avoided in the cathode chamber. Therefore, the spent catholyte leaving the cell as the same acidity as the concentrated solution fed to the cathode chamber of the cell.

A part of the spent catholyte may then be sent through line 28 to a system for concentrating and purifying the sulfuric acid while recovering the small amount of residual ferrous sulfate and other salts present as impurities in the charge mineral. As another possibility, the cathodic solution present in the circuit of the cathode chamber and the tank 17a may be completely withdrawn at the end of one or more runs to start a new run with fresh solution from separators 11, 12 and 16. Also in this case, the withdrawn solution may be treated in a plant for concentration and purification of the sulfuric acid while recovering residual ferrous sulfate and other salts.

FIG. 2 represents an alternative to the process of FIG. 1 wherein the corresponding sections are labelled with the same numbers. According to this less preferred embodiment, the filtrate liquor from separators 11 and 12 consisting of a dilute sulfuric acid solution still containing a certain amount of ferrous sulfate is fed mainly to a single dissolving tank 17, toghether with solid ferrous sulfate from separators 7 and 8, to obtain a ferrous sulfate sulfuric acid solution. The balance of the solution from separators 11 and 12 is sent back to leaching tank 1 by line 31. The ferrous sulfate-sulfuric acid solution effluent from tank 17 is sent to clarifier 29 and the insoluble residues leave the system by line 28 together with the insolubles coming from sections 2,3 and 4 by line 21.

A portion of the clarified solution is passed by line 18 to tank 25 and then it is circulated to the anode chamber of cell 5 to effect a first partial oxidation of ferrous ions to ferric ions in the same manner as described for FIG. 1. The anolyte effluent from cell 5 is fed to the anode chamber of the second electrolytic cell 19 which is separated from the cathode chamber by a fluid-impervious, cation permeable membrane typically consisting of a fluorinated copolymer bearing acid radicals such as sulfonic or carboxylic groups. A class of such membranes which are particularly resistant to acids in an oxidizing environment are sold by DuPont under the commercial name of Nafion. In the said anode chamber, further oxidation of ferrous ions to ferric ions takes place whereby the anodic effluent leaving the system by line 20 contains only residual amounts of ferrous ions.

The second part of the clarified solution from clarifier 29 is fed by line 32 to the cathode chamber of cell 19 wherein the ferrous ions are reduced to the metallic state and plate out onto the periodically replaceable cathode. The acid-enriched spent catholyte is then partially recycled back to tank 17 to renew the ferrous sulfate content thereof and partially purged by line 30, optionally concentrating and recovering the sulfuric acid.

The relative amounts of ferrous sulfate, ferric sulfate and metallic iron, by-products of the process with respect to the iron ions orginally present in the charge mineral, may vary broadly depending upon the ratio of ferrous ions to ferric ions in the leaching solution as will be apparent from the following examples.

In the following examples there are illustrated some preferred embodiments of the invention. However, it should be understood that the invention is not intended to be limited to the specific embodiments.

EXAMPLE 1

100 liters of a sulfuric acid leaching solution of ilmenite were fed to the cathode chamber of a membrane electrolytic cell provided with a hydrogen vent and a titanium sheet cathode. The solution had the following composition: 85.6 g/l of tetravalent titanium; 25.4 g/l of ferric ions; 71.1 g/l of ferrous ions; and (overall) 443.7 g/l of sulfuric acid. The solution was continuously circulated between the cathode chamber and a recycling tank connected in parallel. 7 liters of a ferrous sulfate-sulfuric acid solution were fed to the anode chamber of the same cell separated from the corresponding cathode chamber by an anion-permeable of the MA 3475 type manufactured by Ionics. The anode chamber was also provided with a sheet mesh titanium anode coated with electrocatalytic coating of titanium oxide and ruthenium oxide.

A continuous circulation of the anolyte solution was provided between the anode chamber and a recycling tank connected in parallel. The anolyte solution, prepared by dissolving ferrous sulfate in dilute sulfuric acid had the following composition: 158.6 g/l of ferrous ions and (overall) 308.7 g/l of sulfuric acid.

The operating conditions of the cell were as follows:

| | |
|---|---|
| catholyte circulation in cathode chamber | 60 cm/s |
| anolyte circulation in anode chamber | 10 cm/s |
| cell temperature | 60° C. |
| current density | 750 A/m² |
| cell voltage | 2.2 V |
| average current efficiency: cathodic | 85% |
| anodic | 99% |

The electrolysis was carried out to obtain complete reduction of ferric ions to ferrous ions at the cathode together with an incipient reduction of tetravalent titanium to trivalent titanium. The composition of the catholyte at the beginning and the end of the test run are reported in Table I.

TABLE I

| | Catholyte composition in g/l | |
|---|---|---|
| | Start of Run | End of Run |
| Ti(IV) | 85.6 | 81.7 |
| Ti(III) | — | 3.9 |
| Ferric ions | 25.4 | — |
| Ferrous ions | 71.1 | 96.5 |
| $H_2SO_4$ (overall) | 443.7 | 421.2 |

The composition of the anolyte at the beginning and the end of test run are reported in Table II.

TABLE II

| | Anolyte composition in g/l | |
|---|---|---|
| | Start of Run | End of Run |
| Ferric ions | — | 35.2 |
| Ferrous ions | 158.6 | 123.4 |
| $H_2SO_4$ (overall) | 308.7 | 331.2 |

Therefore, according to an immediate mass balance, about 37% of the iron originally present in the ilmenite leaching solution was recovered as ferric sulfate.

EXAMPLE 2

An electrolytic cell similar to the one described in Example 1 provided with a MA 3475 type anion-permeable membrane manufactured by Ionics was utilized for this run. The membrane separated a cathode chamber and an anode chamber, respectively provided with a titanium sheet cathode and a titanium mesh anode provided with a titanium oxide and ruthenium oxide electrocatalytic coating. The solution recovered from the anolyte circuit of the electrolytic cell of Example 1 and having the following composition: 32.5 g/l of ferric ions; 123.4 g/l of ferrous ions and (overall) 331.2 g/l of sulfuric acid, was passed into the circuit of the anode chamber of the cell, a recycling tank connected in parallel thereto and a circulation pump. The cathode chamber of the cell was connected with a saturation tank filled with ferrous sulfate and dilute (about 10%) sulfuric acid. The saturated solution was continuously circulated through the cathode chamber of the cell, while the effluent spent solution was fed directly back to the saturation tank.

The operating conditions of the cell were the following:

| | | |
|---|---|---|
| catholyte circulation in cathode chamber | | 60 cm/s |
| anolyte circulation in anode chamber | | 60 cm/s |
| cell temperature | | 60° C. |
| current density | | 400 A/m$^2$ |
| cell voltage | | 3.7V |
| average current efficiency: | cathodic | 75% |
| | anodic | 95% |

The electrolysis was carried out to a residual ferrous ion content in the anolyte of about 20 g/l. The anolyte compositions at the beginning and the end of the test run are shown in Table III.

TABLE III

| | Anolyte Composition in g/l | |
|---|---|---|
| | Start of Run | End of Run |
| Ferric ions | 35.2 | 138.1 |
| Ferrous ions | 123.4 | 20.5 |

TABLE III-continued

| | Anolyte Composition in g/l | |
|---|---|---|
| | Start of Run | End of Run |
| $H_2SO_4$ (overall) | 331.2 | 421.4 |

At the end of the run, the cathode was coated with a spongy and barely coherent iron layer weighing 4.0 kg which corresponded to the amount of ferrous ions reduced to the metal state at the cathode itself.

The mass balance indicates that in the results of Examples 1 and 2, about 82.5% of the iron originally present in the ilmenite leaching solution was recovered as ferric sulfate, 16% as metal iron and the balance (only 1.5%) as residual ferrous sulfate.

Various modifications of the processes of the invention may be made without departing from the spirit or scope thereof and it is to be understood that the invention is to be limited only as defined in the appended claims.

We claim:

1. A method of reducing ferric ions in a sulfuric acid ilmenite leach solution to ferrous ions comprising circulating a sulfuric acid ilmenite leach catholyte solution containing $Ti_{4+}$ ions through the cathodic compartment of an electrolysis cell separated by a fluid impervious anion exchange membrane from the anodic compartment, circulating a ferrous sulfate anolyte solution through the anodic compartment of the electrolysis cell and impressing an electrolysis current across the cell reducing the ferric ions in the catholyte to ferrous ions and oxidizing a portion of the ferrous ions to ferric ions in the anolyte.

2. The method of claim 1 wherein the effluent from the cathode is free of ferric ions and contains up to 4 g/l of trivalent titanium ions.

3. The method of claim 1 wherein the anolyte solution containing ferrous ions is obtained by dissolving ferrous sulfate crystallized from the effluent from the cathode chamber containing titanyl sulfate and ferrous sulfate.

4. A method of treating a sulfuric acid leach solution of ilmenite containing iron and titanium salts comprising leaching ilmenite with an acid solution to obtain an acid leach solution containing ferric ions and titanium ions, subjecting an acid solution containing ferric ions and tetravalent titanium ions to electrolysis in the cathode compartment of an electrolysis cell to selectively reduce at the cathode at least part of tetravalent titanium ions to trivalent titanium ions and contacting the leach solution with the solution containing trivalent titanium ions to reduce the ferric ions to ferrous ions.

5. The method of claim 4 wherein the electrolysis cell is separated into anode and cathode compartments by a diaphragm and the anolyte is an acid solution containing ferrous ions which are oxidized to ferric ions.

6. The method of claim 5 wherein the diaphragm is a fluid-impervious, anion-exchange membrane.

7. A method of treating sulfuric acid ilmenite leach solutions in a process for producing titanium dioxide which comprises electrolytically reducing ferric ions in the leach solution to ferrous ions by passing said solution through the cathode chamber of a first electrolysis cell separated from the anode chamber by an anion exchange membrane gathering crystallized ferrous sulphate precipitated and filtered off from the reduced titanyl and ferrous sulfate solution, gathering the liquid effluents comprised of a sulfuric acid solution of ferrous sulfate from the subsequent stages of the titanyl sulfate processing, forming a ferrous sulfate solution by dissolving said crystallized ferrous sulfate in said liquid effluents in a dissolving tank, passing a first portion of the ferrous sulphate solution through the cathode chamber of a second electrolysis cell separated from the anode chamber by an ion exchange membrane, plating out metal iron onto the cathode of the second cell and recovering it therefrom, passing a second portion of the ferrous sulfate solution through the anode chambers of the two cells and withdrawing therefrom an anolyte solution containing a major amount of ferric sulfate and a residual amount of ferrous sulfate.

8. The method of claim 7 wherein the cathode chamber of the second electrolysis cell is separated from the corresponding anode chamber by a cation exchange membrane and the iron-depleted and sulfuric acid-enriched solution effluent from the cathodic chamber of the second electrolysis cell is purged off.

9. The method of claim 7 wherein the cathode chamber of the second electrolysis cell is separated from the corresponding anode chamber by an anion exchange membrane and the iron depleted solution effluent from the cathode chamber of the second electrolysis cell is at least partially recycled to the dissolving tank.

10. The method of claim 7 wherein two separate ferrous sulfate solutions are prepared in two separate dissolving tanks, a first solution obtained by dissolving in the first tank a portion of the ferrous sulfate crystallized and filtered off from the reduced titanyl and ferrous sulfate solution, being passed through the anode chambers of the two electrolysis cells, and a second ferrous sulfate solution obtained by dissolving in the second tank a second portion of said crystallized ferrous sulphate in the liquid effluents from the subsequent stages of the titanyl sulfate processing, said second ferrous sulfate solution being passed through the cathode chamber of the second electrolysis cell.

* * * * *

UNITED STATES PATENT AND TRADEMARK OFFICE
CERTIFICATE OF CORRECTION

PATENT NO. : 4,230,542
DATED : Oct. 28, 1980
INVENTOR(S) : Carlo Traini et al.

It is certified that error appears in the above—identified patent and that said Letters Patent is hereby corrected as shown below:

Column 7, line 33, "as the same acidity" should read -- has the same acidity --.

Signed and Sealed this

Fifth Day of May 1981

[SEAL]

Attest:

RENE D. TEGTMEYER

*Attesting Officer*     *Acting Commissioner of Patents and Trademarks*